United States Patent [19]

Weber

[11] Patent Number: 5,375,623
[45] Date of Patent: Dec. 27, 1994

[54] CARTRIDGE VALVE

[76] Inventor: Günter Weber, Hauptplatz 23, A-2474 Gattendorf, Austria

[21] Appl. No.: 98,292

[22] PCT Filed: Feb. 5, 1992

[86] PCT No.: PCT/AT92/00012
§ 371 Date: Aug. 2, 1993
§ 102(e) Date: Aug. 2, 1993

[87] PCT Pub. No.: WO92/14085
PCT Pub. Date: Aug. 20, 1992

[30] Foreign Application Priority Data

Feb. 6, 1991 [AU] Australia ................. 255/91
Mar. 4, 1991 [AU] Australia ................. 454/91

[51] Int. Cl.$^5$ ................. F16K 31/06; F16K 27/02
[52] U.S. Cl. ................. 137/454.5; 137/599.2; 251/129.07; 251/282
[58] Field of Search ............ 137/454.5, 599.2; 251/129.07, 282

[56] References Cited

U.S. PATENT DOCUMENTS

| | | | |
|---|---|---|---|
| 3,148,860 | 9/1964 | Morris | 137/599.2 X |
| 4,825,909 | 5/1989 | Martin et al. | 137/599.2 X |
| 4,921,208 | 5/1990 | LaMarca | 251/30.04 |
| 5,056,642 | 9/1991 | Bright | 251/129.07 X |
| 5,067,687 | 11/1991 | Patel et al. | 137/454.5 X |
| 5,116,028 | 5/1992 | Mintgen | 137/599.2 X |
| 5,178,359 | 1/1993 | Stobbs et al. | 137/454.5 X |

FOREIGN PATENT DOCUMENTS 45141   7/1979  Australia.
2564567 11/1985 France.
26334  of 1914  United Kingdom.

*Primary Examiner*—Stephen M. Hepperle
*Attorney, Agent, or Firm*—Karl Hormann

[57] ABSTRACT

Pressure compensated cartridge valve with a valve housing (1, 2) in which is axially guided a valve stem (10) which at one of its ends is provided with a valve cone (12) the sealing surface (13) of which in the closed position engages an annular rim (15) formed at the inside of the housing, whereby an annular chamber (20) provided between valve stem (10) and housing on one side of the annular chamber constituted one pressure connection of the valve by way of connecting bore (21), and the port chamber (13) of the housing bore (9) receiving the valve stem (10) constitutes a further pressure connection of the valve on the other side of the annular rim (15), and whereby a pressure balance bore (23) connects the port chamber (19) with a counter pressure chamber (24) within the valve housing (1, 2) which counter pressure chamber surrounds the end of the valve stem remote from the valve cone (12), and whereby the pressure balance bore (23) extends within the valve housing (1, 2) and a channel (36) connecting the annular chamber (20) with the port chamber (19) is formed within the valve stem (10), the opening (37) towards the port chamber (19) of which is closed by a spring biased ball seal (45, 40) or a spring biased cone seal (40).

18 Claims, 3 Drawing Sheets

CARTRIDGE VALVE

The invention relates to a pressure compensated cartridge valve with a valve housing within which a valve stem is axially guided which at one of its ends is provided with a valve cone the sealing surface of which in the closing position engages an annular rim formed at the inside of the housing, whereby an annular chamber provided between valve stem and housing on one side of the annular rim constitutes, by way of a connecting bore, one pressure connection of the valve, and the port chamber of the housing bore receiving the valve stem constitutes a further pressure connection of the valve on the other side of the annular rim, whereby a pressure balancing bore connects the port chamber with a counter pressure chamber in the valve housing, which counter pressure chamber surrounds the end of the valve stem remote from the valve cone.

In cartridge valves in accordance with an unpublished older proposal pressure compensation is obtained by the pressure balance bore extending axially within the valve stem and in this manner connecting the pressure chamber on one side of the valve stem with the counter pressure chamber on the other side of the valve stem whereby the force effect of the operating pressure acting on the valve stem is compensated and the only force required for actuating the valve stem is the force necessary for moving the valve stem. Pressure compensated cartridge valves of this kind cannot be provided with a recoil function because the recoil path would have to extend within the interior of the valve stem which is already occupied by the pressure balance bore.

Therefore, it is an object of the invention to provide a cartridge valve of the kind referred to above which provides for pressure compensation as well as, in one direction, a recoil function. In accordance with the invention this object is accomplished in that the pressure balance bore is extending in the valve housing and that within the valve stem there is provided a channel connecting the annular chamber with the port chamber, the opening of the channel toward the port chamber being closed by a spring biased ball seal or by a spring biased conical seal.

In this manner there is provided a cartridge valve which is of simple and compact structure, yet is pressure compensated and provided with a recoil path. The invention may be used in connection with two position/two way (2/2) valves as well as with two position/three way (2/3) valves and permits free flow in one direction as soon as the biasing force of the spring is overcome by the operating pressure, while the normal two position/two way (2/2) or two position/three way (2/3) function is maintained at the same time.

Preferably the recoil valve function is obtained by providing, preferably in an integrated manner, a perforated cap on the head of the valve stem in front of the opening of the channel, the cap receiving the biasing spring which pushes the ball seal or the cone seal against the opening of the channel. In this manner, the cartridge valve in accordance with the invention may be manufactured without substantial adjustments in the manufacturing tools.

Alternatively, the biasing spring may be arranged within the channel and push the ball seal or the conical seal against an annular rim protruding at the inside of the channel ahead of the opening of the channel. Such a structure would result in a reversal of the flow-through direction of the recoil path, where such a valve function is required.

An especially simple structure of the valve in accordance with the invention is obtained by making the valve receptacle in which the valve is inserted part of the valve structure by arranging the biasing spring within the valve receptacle between its bottom and the head of the valve stem to push the ball seal or the conical seal against the opening of the channel.

A preferred improvement of the subject matter of the invention resides in the counter pressure chamber constituting a third pressure connection of the valve by way of a connecting bore. In this manner, the number of possible applications of the valve is increased. The valve is specially suited as a so-called tube-fracture valve for cylinders of hydraulic loading platforms: The valve integrates the functions of a pressure compensated two position/two way (2/2) valve and of a check valve while providing unimpaired access to all pressure connections. For instance, if the valve is mounted into the bottom of a fluid cylinder, additional fluid control elements, separate connecting bores and manifolds (Verbindungsbohrungen) in the bottom of the cylinder may be dispensed with.

In a preferred configuration of this embodiment the connecting bore of the counter pressure chamber is extending through the side wall of the housing of the valve which in this area is sealingly surrounded by a sleeve forming an annular chamber extending into a part of a pressure connection connected with the sleeve. In this manner, there is provided a structurally simple and sealed connection of a pressure conduit with the counter pressure chamber.

A special pressure fluid control including a cartridge valve of this kind is characterized, in accordance with the invention, by the cartridge valve being seated in a valve receptacle constituted by a recess within a pressure fluid control element, the receptacle enclosing the port chamber, thus connecting the pressure balance bore with the channel within the valve stem, whereby the outlet side of the valve is constituted by the first pressure connection and the valve intake side is constituted by the third pressure connection. This makes it possible to reduce to two the number of bores necessary within the pressure fluid control element, that is to say a bore for receiving the valve and a bore connecting to the cylinder chamber.

The invention will hereafter be explained in greater detail on the basis of embodiments depicted in the drawings.

In the drawings

Figure 3:
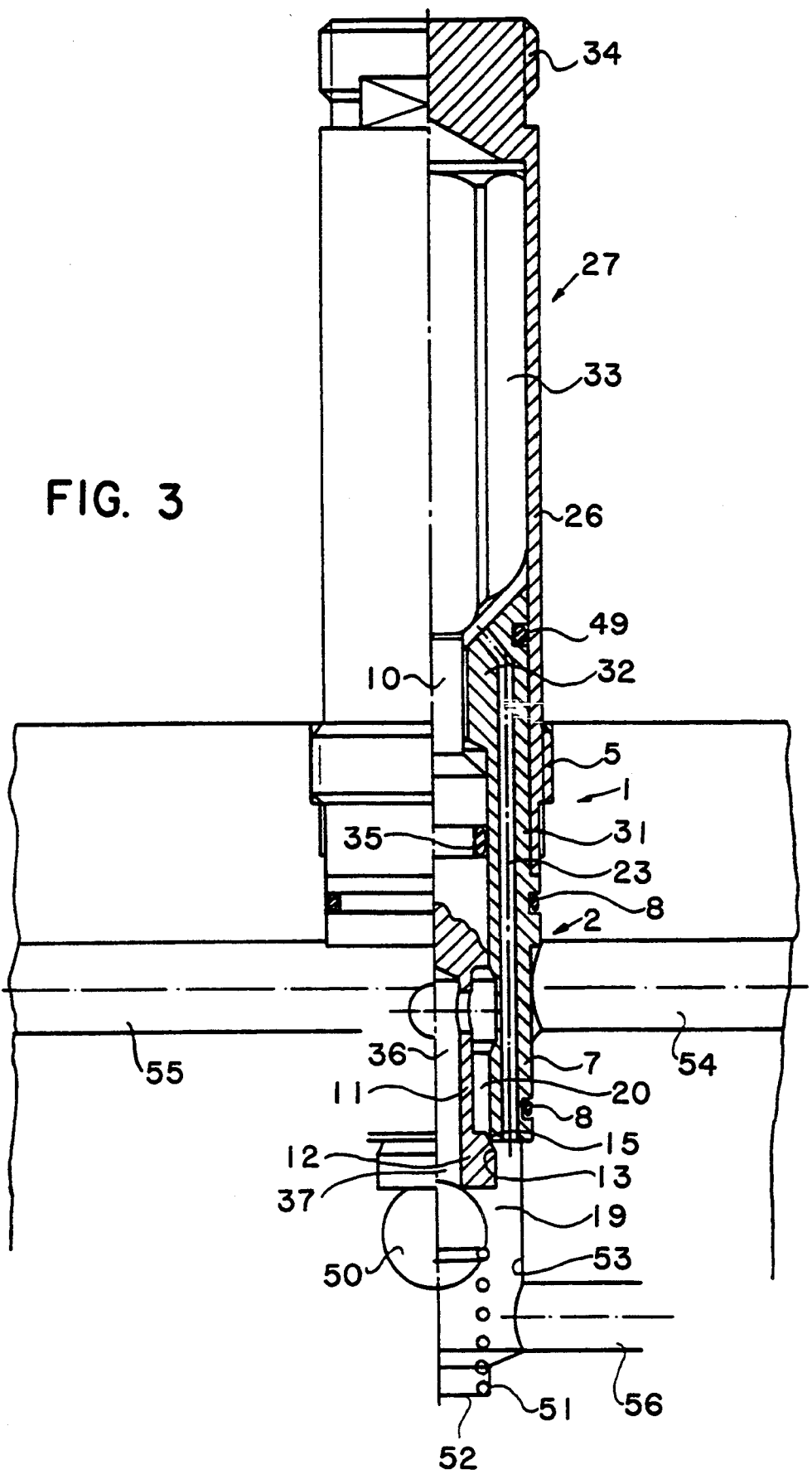
Figure 4:
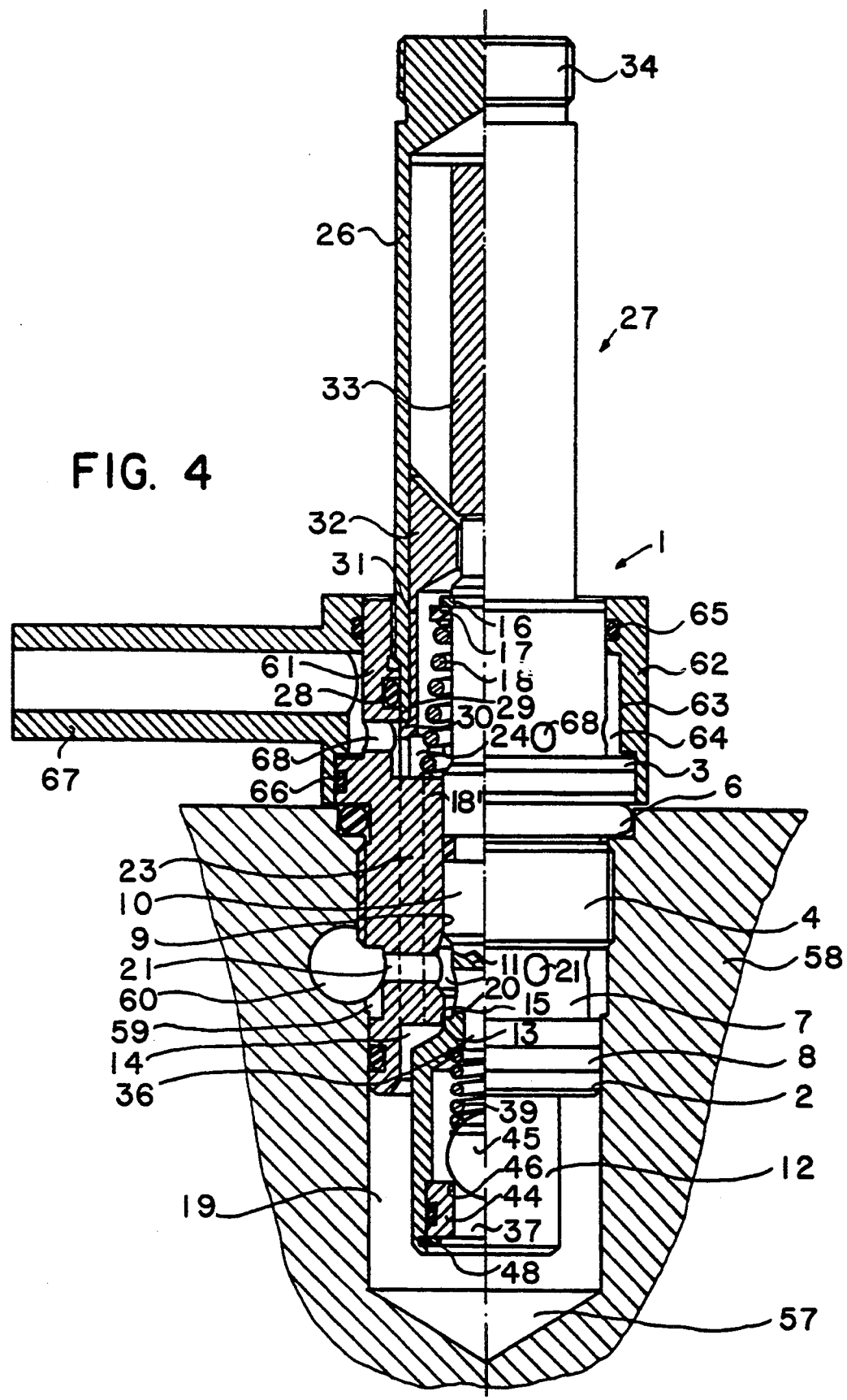

FIG. 3 depicts half of an exterior view and half of a longitudinal section through a third embodiment of the invention inserted into a partially depicted valve receptacle; and FIG. 4 depicts half of an exterior view and half of a longitudinal section through a further embodiment of a cartridge valve in accordance with the invention, inserted into a partially depicted valve receptacle with which it forms a pressure fluid control in accordance with the invention.

Figure 1:
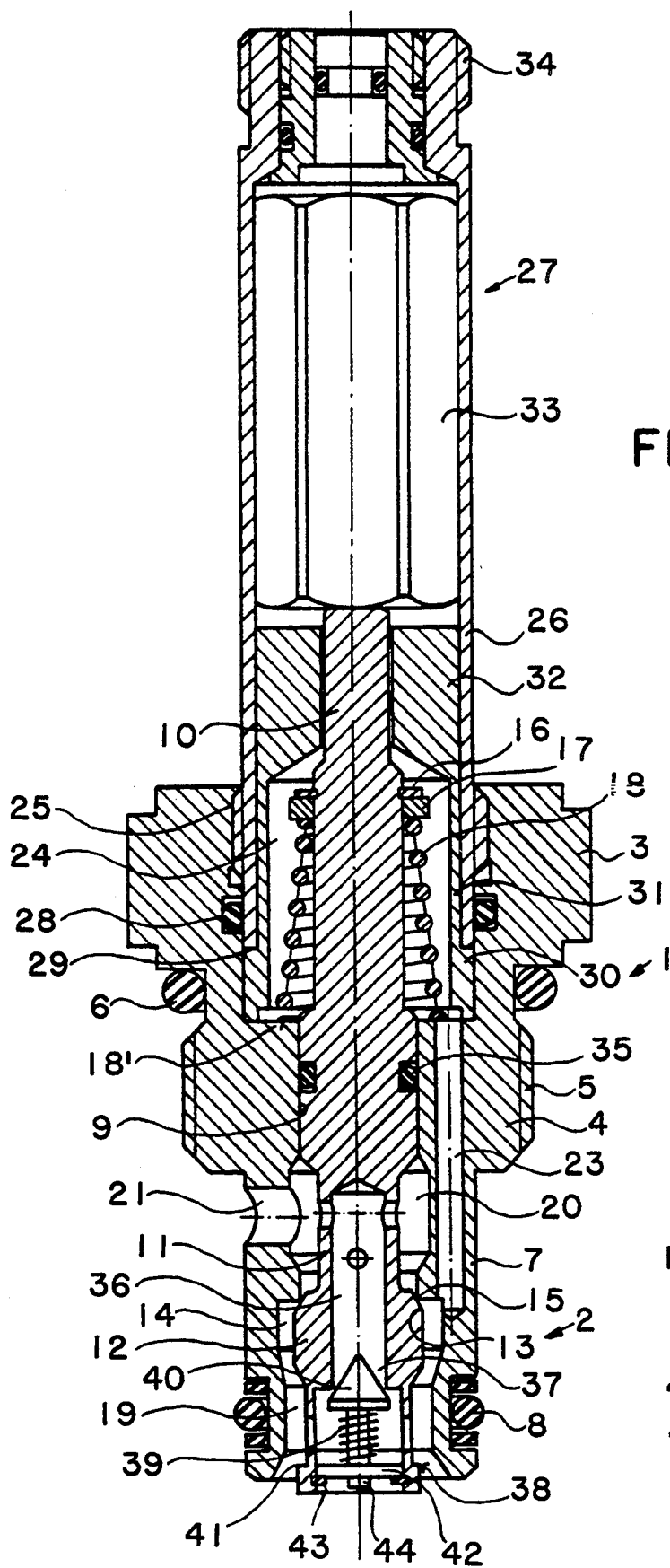
FIG. 1 is a longitudinal section through a first embodiment of the invention.

The valve depicted in FIG. 1 is provided with a valve housing 1, 2 the upper portion 1 of which is integrally formed with the lower portion 2. At its upper end the upper portion 1 is provided with an end flange 3, and at its lower portion 2 it is provided with a threaded insertion portion 4 provided with an external thread 5 of standardized dimensions, so that the upper portion 1 together with its integral lower portion 2 may be threadedly inserted into a standardized valve receptacle (not shown in FIG. 1). A sealed seat of the end flange 3 in the valve receptacle is ensured by an O-ring 6. Valves having this kind of housing structure are also known as screw insertion cartridge valves.

The lower portion 2 of the housing is of lesser external diameter than the upper portion 1 of the housing, and, in its threadedly inserted condition, it thus forms a valve section 7 of reduced diameter at the lower end of which there is provided an O-ring 8 extending within a peripheral groove. The O-ring 8 serves as a circumferential seal of the lower section 7 within a bore section of reduced diameter of the valve receptacle.

A central bore 9 with a plurality of shoulders is extending through the body portions 1, 2, a valve stem 10 being mounted for axial movement within the bore. At its lower end the valve stem 10 is provided with a section 11 of reduced diameter which ends in a stem head 12 of enlarged diameter. The upper rim of the stem head 12 adjacent to the section 11 is tapered so that it forms a frustro-conical surface 13 which imparts to the valve head 12 the function of a valve cone. The stem head or valve cone 12 is movable within a portion 14 of enlarged internal diameter of the lower portion 2 of the housing, and in the closed condition of the valve it engages, with its frustro-conical surface 13 serving as a sealing surface, an annular rim 15. The annular rim 15 is constituted by the transition between the enlarged bore section 14 within which the valve cone 12 is moving and the axial bore section within which the valve stem 10 is moving.

At its upper section the valve stem 10 is provided with a flange 17 secured by a clamping ring 16, which flange serves as an abutment for a return spring 18 the other end of which is supported by an abutment 18' at the inside of the threaded insertion portion 4. Thus, the valve stem 10 is spring biased in an upward direction so that the sealing surface 13 of the valve cone 12 is pressed against the annular rim 15 of the lower portion 2 of the housing. In the rest position shown, the annular valve gap between the sealing surface 13 and the annular rim 15 is thus closed.

The port chamber 19 below the valve cone 12 constitutes one of the pressure connections of the valve, and the annular chamber 20 which is formed upwardly of the valve gap in the area of the stem section 11 of reduced diameter is provided with a radial bore 21 which constitutes a further pressure connection of the valve. The pressure acting within the annular chamber 20 acts at the same time on the upper and lower flaring surfaces of the stem section 11 and is thus compensated in its effect upon the stem 10.

In accordance with the invention the port chamber 19 is connected to the counter pressure chamber 24 by way of a pressure balance bore 23 extending within the housing 1, 2 of the valve. The counter pressure chamber 24 is formed by an increased diameter section of the bore in the upper portion 1 of the housing, and it receives the upper end of the valve stem 10 including the spring bias feature 16–18. In this manner, the pressure acting at one pressure connection, i.e. the port chamber 19, is directed to both sides of the valve stem, and compensated.

Because of the pressure compensation of the connections 19 and 21, no axial force will act on the stem 10 in either flow direction when the valve is subjected to pressure. The closing force of the valve is thus generated solely by the resilient force of the biasing spring 18.

In the area of the end flange 3 the housing bore 9 is provided with an internal thread 25 for receiving a substantially tubular housing 26, of non-magnetic steel, of an actuator apparatus 27 acting axially of the valve stem 10, which housing is provided at one end with an external thread. Adjacent to the internal thread 25 there is provided within the housing bore 9 an annular groove within which there is positioned a sealing ring 28.

The front face 29 of the housing 26 threaded into the end flange 3 abuts against an end flange 30 of a sleeve 31 inserted into the housing 26. For the purpose of forming a slide bushing 32 for the reduced upper end of the valve stem 10, the other end of the sleeve 31 is reduced, the upper end of the stem 10 engaging a core 33 which is moveably guided within the housing 26. The core 33 is made of a magnetizable material, for instance soft iron. A magnetic coil (not shown) is mounted on the housing 26 and is affixed thereto by means of a threaded nut (also not shown) which is threaded onto the upper end of the housing 26. When the magnetic coil is electrically energized, the core 33 and, hence, the valve stem 10 are pushed downwardly.

A slip seal ring 35 which sealingly surrounds the stem 10 is provided for sealing the valve outlet connection 21 with respect to the pressure chambers 19, 24.

In accordance with the invention a recoil function is provided by the following arrangement: A channel 36 connecting the port chamber 19 and the annular chamber 20 is formed within the valve stem 12. The channel 36 is formed by an axial recess extending from the front face of the stem head 12 and by a radial bore extending from the wall of the stem in the area of the section 11.

A perforated cap 38 is integrally formed with the front face of the stem head 12 in front of the opening 37 of the channel 36. A biasing spring 39 pushing a sealing cone 40 from below against the channel opening 37 is provided within the cap 38. In the embodiment shown, the cap 38 is formed by a laterally perforated tubular member 41 which terminates in a centrally bored disk 42 which is maintained in its position by a clamping ring 43 seated in an annular groove at the inside of the tubular member 41. A pin 44 surrounded by the spring 39 and supporting the sealing cone 40 is guided within the center bore of the disk 42.

This structure provides the function of a pressure compensated two position/two way (2/2) valve with a recoil function.

Figure 2:
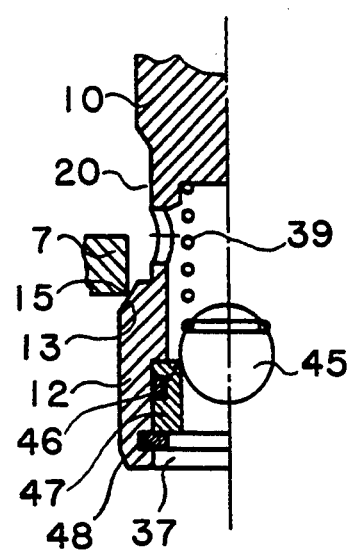
FIG. 2 is a detail of a longitudinal section through a second embodiment of the invention.

In the embodiment of the stem 12 of FIG. 2 the recoil function is directed opposite to the one of to FIG. 1. In this case, the biasing spring 39 is arranged within the interior of the channel 36 and pushes a ball seal 45 against an annular rim 46 protruding from the inside of the channel forwardly of its opening 37. The annular rim 46 is formed by the internal margin of a ring 47 inserted into the channel opening 37 and retained by a snap ring 48 seated in an annular groove in the inside of the channel opening 37.

FIG. 3 depicts a further embodiment of the invention of like function but simplified structure. The housing 26 is integrally formed with the upper portion 1 which is not provided with an end flange but with an external thread 5 only. The lower portion 2 of the valve housing is separated from the upper portion 1 and is inserted into it, with a sealing ring 49 providing a seal between them. The lower portion 2 in turn is integrally formed with the sleeve 31 and the guide bushing 32. Again, the pressure balance bore 23 is extending in the housing 1, 2 of the valve, and, more particularly, in the lower section 2 with its integrated sleeve 31 and guide bushing 32, and the channel 36 forming the recoil path is extending within the stem 10. In this embodiment, the channel opening 37 is closed towards the port chamber 19 by a ball seal 50 which is pushed against the channel opening 37 by a biasing spring 51. In this embodiment, the lower end of biasing spring 51 is supported by the bottom 52 of the depicted valve receptacle 53, into which the valve has been threadedly inserted by its thread 5. Pressure connection bores 54, 55, and 56 extend from this valve receptacle 53. The bore 54, 55 constitutes one of the pressure connections of the valve, the bore 56 constitutes the other pressure connection of the valve.

FIG. 4 depicts a further development of the valve of FIG. 1 making use of the recoil path with a ball seal 45 of FIG. 2. (Instead of a ball seal a cone seal could be used to the same advantage and, if desired, the recoil direction could be reversed by reversing the arrangement of biasing spring 39, sealing element 45 and annular rim 46.) The valve is here threadedly inserted into a standardized valve receptacle formed by a recess having a plurality of shoulders and provided in a partially depicted pressure fluid control element 58.

The annular chamber 20 formed within the bore 9 of the housing in the area of the stem section 11 of reduced diameters is connected to an annular chamber 59 by way of the bores 21 radially extending through the housing 1, 2, the annular chamber 59 being formed within the recess 57 in the area of the housing section 7 of reduced diameter. A bore 60 extending within the pressure fluid control element 58 normal to the recess 57 opens into this annular chamber 59 and thus constitutes a first pressure connection of the valve.

The port chamber 19 of the housing bore 9 receiving the head of the stem 12 constitutes a second pressure connection of the valve and could be used by way of a further bore (not shown) extending within the pressure fluid control member 58. In the shown disposition of the cartridge valve the port chamber 19 is, however, enclosed by the terminal section of the recess 57 so that the pressure balance bore 23 is connected to the channel 36 by way of the port chamber 19. However, in this embodiment there is provided a further pressure connection, which will now be described.

The upper end section 61 and the end flange 3 of the housing 1, 2 are enclosed by a sleeve 62 slipped over or screwed thereon and provided with a middle section 63 of reduced internal diameter resulting in an annular chamber 64 which surrounds the housing 1, 2 in the area of the counter pressure chamber 24 which is sealed against the outside by means of sealing rings 65, 66. A portion 67 of a pressure fitting only schematically shown here and integral with the sleeve 62 leads into this annular chamber 64. The annular chamber 64 is in turn connected to the counter pressure chamber 24 by connecting bores 68 extending through the side wall of the valve housing 1, 2.

The modus operandi of the valve in this pressure fluid arrangement is as follows. The pressure conduit (not shown) of a fluid pump is connected to the fitting 67. The pressure extends into the port chamber 19 by way of the pressure balance bore 23. As long as the valve stem 10 is not actuated, the valve gap at 13, 15 remains closed, and as long as the pressure cannot overcome the force of the biasing spring 39 the valve gap at 45, 46 is also closed. When the pressure increases sufficiently, the check valve in the channel 36, i.e. the valve gap at 45, 46 opens and the pressure medium flows through the discharge opening 60 of the valve.

Counter pressure at the discharge opening 60 of the valve is maintained even after turning off of the pressure at 67 because the path across the check valve in the channel 36 remains closed. This results in the added advantage that in this condition the valve, except for the pressure chamber 29, is not under pressure and may receive the counter pressure at the discharge opening 60 without wear. The counter pressure at the discharge opening 60 will only be reduced again by way of the opened valve gap at 13, 15 when the valve stem 10 is actuated.

A typical application of the pressure fluid control is in the feeding of a lifting cylinder of a loading platform. The pressure fluid control element 58 will in that case be the bottom of the cylinder, and the outlet bore 60 will be a bore within the cylinder bottom leading into the cylinder chamber. The application of pressure at 67 results in outward movement of the piston of the cylinder, and upon turning off the pressure, the piston will remain in its extended position until the valve is actuated and the pressure fluid is discharged by way of the bore 60 and the valve gap 13, 15. If the same control function were to be performed by conventional valves several connecting, interconnecting, valve receiving and manifold bores would have to be provided in the bottom of the cylinder. By contrast, with the valve in accordance with the invention, one recess 57 and one connecting bore 60 is all that is required.

It will be understood that the invention is not limited to the embodiments described. For instance, the shape of the valve stem, of the valve housing, the valve seat/valve cone arrangement, the kind of seal of the channel, the shape of the pressure balance bore, the way in which the sleeve is connected at the valve housing, the way in which the counter pressure is connected, etc. may be changed, provided only the pressure balance bore extend within the valve housing and a recoil path be provided within the valve stem.

What is claimed is:

1. A pressure compensated cartridge valve with a valve housing within which is axially guided a valve stem which at one of its ends is provided with a valve cone the sealing surface of which in the closed position engages an annular rim formed at the inside of the housing, whereby an annular chamber provided between valve stem and housing on one side of the annular rim constitutes one pressure connection of the valve by way of a connecting bore, and the port chamber of the housing bore receiving the valve stem constitutes a further pressure connection of the valve on the other side of the annular rim, whereby a pressure balance bore connects the port chamber with a counter pressure chamber in the valve housing, which counter pressure chamber surrounds the end of the valve stem remote from the valve cone, characterized by the fact that the pressure balance bore (23) extends within the valve housing (1, 2) and that a channel (36) connecting the annular chamber (20) with the port chamber (19) is formed within the valve stem (10), the opening (37) towards the port chamber (19) of which is closed by a spring biased ball seal (45; 50) or a spring biased cone seal (40).

2. The pressure compensated cartridge valve as defined in claim 1, characterized by the fact that a perforated cap (38) of integrated structure is formed in front of the channel opening (37) which cap receives the biasing spring (39) which pushes the ball seal or the cone seal (40) against the channel opening (37).

3. The pressure compensated cartridge valve as defined in claim 1, characterized by the fact that the biasing spring (39) is arranged within the channel (36) and pushes the ball seal (45) or the cone seal against an annular rim (46) protruding from the inside of the channel in front of the channel opening (37).

4. Pressure compensated cartridge valve as defined in claim 1 inserted within a valve receptacle, characterized by the fact that the biasing spring (51) is arranged within the valve receptacle (53) between the bottom (52) and the head (12) of the valve stem and pushes the ball seal (50) or the cone seal against the channel opening (36).

5. Pressure compensated cartridge valve as defined in claim 1, characterized by the fact that the counter pressure chamber (24) by way of a connecting bore (68) constitutes a third pressure connection of the valve.

6. Pressure compensated cartridge valve as defined in claim 5, characterized by the fact that the connecting bore (68) of the counter pressure chamber (24) extends through the sidewall of the valve housing (1, 2) which in this area is sealingly surrounded by a sleeve (62) in a manner forming an annular chamber (64) which leads to a part (67) of a pressure connecting manifold connected with the sleeve (62).

7. The pressure compensated cartridge valve as defined in claim 5, characterized by the fact that the cartridge valve is inserted into a valve receptacle constituted by a recess (57) in a pressure fluid control element (58) which valve receptacle encloses the port chamber (19) and thus connects the pressure balance bore (23) with the channel (36) within the valve stem (10), and that the first pressure connection (20, 21, 59, 60) constitutes the valve outlet side and the third pressure connection (24, 68, 64, 67) constitutes the valve intake side.

8. Pressure compensated cartridge valve as defined in claim 6, characterized by the fact that the cartridge valve is inserted into a valve receptacle constituted by a recess (57) in a pressure fluid control element (58) which valve receptacle encloses the port chamber (19) and thus connects the pressure balance bore (23) with the channel (36) within the valve stem (10), and that the first pressure connection (20, 21, 59, 60) constitutes the valve outlet side and the third pressure connection (24, 68, 64, 67) constitutes the valve intake side.

9. A pressure compensated cartridge valve, comprising:

valve housing means comprising annular rim means in the interior thereof;

annular chamber means in said valve housing means on one side of said annular rim means and provided with first bore means comprising first pressure connecting means of said valve;

port chamber means in said valve housing means on the other side of said annular rim means comprising further pressure connecting means of said valve;

valve stem means axially guided within said valve housing means and extending in said annular and port chamber means thereof;

valve cone means comprising sealing surface means provided at one end of said valve stem means, said sealing surface means engaging said annular rim means when said valve is closed;

counter pressure chamber means in said valve housing means and surrounding the end of said valve stem means opposite said valve head means;

second bore means extending within said valve housing means and connecting said port chamber means and said counter pressure chamber means;

channel means within said valve stem means for connecting said annular chamber means and said port chamber means, said channel means comprising means forming an opening into said port chamber; and seal means comprising biasing spring means for closing said opening.

10. The pressure compensated cartridge valve of claim 1, wherein said seal means comprises ball seal means.

11. The pressure compensated cartridge valve of claim 1, wherein said seal means comprises cone seal means.

12. The pressure compensated cartridge valve of claim 1, further comprising integrated cap means adjacent said opening for receiving said biasing spring means whereby said seal means is pushed against said opening.

13. The pressure compensated cartridge valve of claim 11, wherein said cap means is perforated.

14. The pressure compensated cartridge valve of claim 1, wherein said channel means comprises further annular rim means in the interior thereof adjacent said opening and wherein said biasing spring is provided within said channel means for pushing said seal means against said further annular rim means.

15. The pressure compensated cartridge valve of claim 1, further comprising receptacle means for receiving said cartridge valve therein, wherein said biasing spring means is provided within said receptacle means at a position opposite said valve head means for pushing said seal means against said opening.

16. The pressure compensated cartridge valve of claim 1, wherein said counter pressure chamber means is provided with pressure connection bore means.

17. The pressure compensated cartridge valve of claim 16, further comprising sleeve means sealingly surrounding said valve housing means to form second annular chamber means between said sleeve means and said valve housing means, said pressure connection bore means extending through said valve housing means into said second annular chamber means and wherein said second annular chamber means is adapted to connect to manifold means connected to said sleeve means.

18. The pressure compensated cartridge valve of claim 1 adapted for insertion in a valve receptacle of the kind comprising a recess in a pressure fluid control element, wherein said port chamber is enclosed by said valve receptacle and said second bore means is connected to said channel means within said valve stem means, and wherein said first pressure connecting means comprises valve outlet means and said pressure connection bore means comprises valve intake means.

* * * * *

UNITED STATES PATENT AND TRADEMARK OFFICE
CERTIFICATE OF CORRECTION

PATENT NO. : 5,375,623
DATED : December 27, 1994
INVENTOR(S) : Weber

It is certified that error appears in the above-indentified patent and that said Letters Patent is hereby corrected as shown below:

On the Title Page, Item [30] Foreign Application Priority Data, in both instances, change "[AU] Australia" to —[AT] Austria—.

Signed and Sealed this

Eighteenth Day of April, 1995

*Attest:*

BRUCE LEHMAN

*Commissioner of Patents and Trademarks*

*Attesting Officer*